United States Patent Office 3,385,868
Patented May 28, 1968

3,385,868
PROCESSES FOR FUSED CYCLOPROPYL STEROIDS
Alexander D. Cross, Mexico City, Mexico, assignor to Syntex Corporation, Panama, Panama, a corporation of Panama
No Drawing. Continuation-in-part of application Ser. No. 441,318, Mar. 19, 1965. This application Oct. 15, 1965, Ser. No. 496,719
Claims priority, application Mexico, Apr. 17, 1964, 76,755
23 Claims. (Cl. 260—397.4)

ABSTRACT OF THE DISCLOSURE

Process of introducing a fused cyclopropyl group across a double bond of a steroid nucleus in an allylic or homoallylic position with respect to a pre-existing hydroxyl group, the cyclopropyl group having a cis configuration with respect to the hydroxyl group. Process of cleaving such fused cyclopropyl group to yield a methyl group having the same configuration.

This invention is a continuation-in-part of Ser. No. 441,318, filed Mar. 19, 1965, now abandoned.

The present invention is related to a novel procedure for the preparation of cyclopentanophenanthrene derivatives.

More particularly, the present invention is related to a novel procedure for introducing a methylene group into vicinal carbons of the steroid nucleus in a position allylic or homoallylic with respect to a pre-existing hydroxyl group, from the corresponding compounds which have a double bond between such vicinal carbons.

In particular, this invention is related to the conversion of a steroid with a free hydroxyl, in an allylic or homoallylic position with respect to a double bond, into the corresponding steroid having a cyclopropane ring in lieu of the double bond and having a cis configuration with respect to the hydroxyl.

This invention is also directed at the process of cleaving such fused cyclopropane rings to yield a methyl group having the same configuration as the cyclopropyl group.

The process of the present invention by which the cyclopropane ring containing derivatives are prepared comprises treating a steroid of the type mentioned hereinbefore with an iodide of an iodomethyl metal, wherein the metal has an oxidation potential of between +0.25 v. and +1.18 v. (see Chtarles D. Hodgmen, Handbook of Chemistry and Physics, 42nd ed., 1960–1961, Chem. Rubber Publishing Co., page 1740) preferably about +0.76 v. such as zinc or chromium, in the absence of alkyl iodides.

The steroids which may serve as convenient starting materials for the process of the present invention may belong to the estrane, androstane, pregnane, cholestane, coprostane, stigmastone, ergostane, cardenolide series, etc., including compounds of abnormal configuration in each series, e.g. 9β compounds. The starting compound, in addition to the double bond-allylic or homoallylic hydroxyl grouping, may have present in the molecule a variety of other substituents without having these interfere with the reaction, such as hydroxyls in positions different from that mentioned, lower alkyl, especially methyl, and/or halogens at any position on the molecule, free or ketalized ketonic groups, or acyloxy groups, on any carbon of the molecule.

The iodo-methyl iodide mentioned hereinbefore which constitutes the basic reagent of one process of the present invention, may be prepared before the reaction and then the steroid may be treated with said reagent, or it may be prepared in situ, i.e., when the steroid is already present. In any case, this reagent is obtained by treatment of methylene iodide with a metal having an oxidation potential comprised within the limits mentioned hereinbefore, or preferably with a couple of said metal with another metal having an oxidation potential between approximately −0.3 and −1.7 v., such as copper, mercury, silver, palladium, etc., optionally in a solvent of the type used for the reaction, and preferably at reflux temperature from about 1 to 4 hours and if desired, in the presence of catalytic amounts of iodine. Examples of metal couples which are suitable and may be prepared by conventional methods known to the one skilled in the art, are: zinc-silver, chromium-copper, chromium-palladium, and the like.

The novel reaction object of the present invention is carried out in an organic solvent, preferably in a hydrocarbon solvent having one or more ether functions in the molecule, such as ethyl-ether, dioxane, tetrahydrofuran, the dimethyl ether of diethyleneglycol(diglyme), the dimethyl ether of triethyleneglycol(triglyme), and the like.

Heretofore, when reaction of iodo-methyl-zinc iodide is applied to unsaturated steroid compounds under the conditions specified in the literature for other more simple compounds, very low yields are observed, especially when the double bond is placed between two tertiary carbon atoms, for example between C-5 and C-10, between C-8 and C-9, or between C-13 and C-14. According to the present invention, the discovery has been made that upon elimination of the alkyl iodides (which are always present in the reaction mixture as a consequence of secondary reactions), for example, by heating such mixture to a temperature higher than the boiling point of such alkyl iodides and allowing the resulting vapors to escape, quasi-quantitative yields are obtained during the principal reaction. The alkyl iodides which are more frequently present are methyl iodide and ethyl iodide, therefore it is generally sufficient to heat the mixture to a temperature higher than 45° C. and preferably higher than 75° C., at atmospheric pressure, for approximately 20 minutes to 6 hours. In the cases where solvents are used which have a boiling point lower than the limits indicated hereinbefore, such as for example, ethyl ether or tetrahydrofuran, it is preferred to evaporate a fraction of the reacting mixture, which may be comprised between approximately 5% and 90% of the totality of said mixture, thus being eliminated the undesired alkyl iodides. Once this alkyl iodide has been eliminated, the reaction is continued for from about 30 minutes to about 48 hours, or preferably under a pressure higher than the atmospheric pressure at temperatures of from approximately 50° C. to 200° C.

The isolation of the resulting compounds may be carried out by conventional methods such as evaporation of the solvents followed by purification, crystallization, chromatography, etc.

To sum up, the process of the present invention comprises putting in contact a steroid of the type described hereinbefore which has present in the molecule a double bond-allylic or homoallylic hydroxyl system, with at least 1 molar equivalent and preferably an excess of an iodomethyl metal iodide, in a suitable solvent, during a period of time comprised between about 5 minutes and 2 hours, preferably at reflux temperature, subsequently eliminating the alkyl iodide, preferably by evaporation, either by heating the mixture or by simultaneous evaporation, of a fraction of the solvent, and subsequently continuing the reaction for about 30 minutes to 48 hours, preferably under a pressure higher than the atmospheric pressure at temperatures between 50° C. and 200° C., to yield the corresponding steroids having a methylene group (a fused cyclopropyl group) attached to the carbons which were previously linked by a double bond and in position cis with respect to the allylic or homoallylic hydroxyl. In case that two hydroxyls are present, one allylic and one homoallylic, the methylene group will be introduced into the product in the cis position with respect to the allylic hydroxyl. The pressure under which the reaction is effected may vary between approximately 1.1 and 20 atmospheres.

Examples of suitable starting compounds for the present invention are: pregnenolone; dioxgenin; $\Delta^5$-androstene-3β,17β-diol; $\Delta^5$-9β-androstene-3α,17β-diol; 7β,11α-dihydroxy - diosgenin; $\Delta^4$ - androstene - 3β,17β,19 - triol; $\Delta^4$ - androstene - 3α,17β - diol; $\Delta^4$-androstene-3β,17β-diol; $\Delta^{9(11)}$-dehydro - 12 - hydroxy - tigogenin; cholesterol; $\Delta^{5(10)}$-estrene - 3α,17β - diol; $\Delta^{5(10)}$-9β-estrene-3α,17β-diol; 16α - chloro - $\Delta^{5(10)}$-estrene-3α,17β-diol; 17α-methyl-$\Delta^{5(10)}$-estrene - 3α,6α,17β - triol; 17α - ethyl - $\Delta^{5(10)}$-9β-estrene - 3α,6α,17β - triol; 6β - methyl - $\Delta^1$ - androstene-3β,17β - diol; 6,6 - dimethyl - $\Delta^4$ - cholestene - 3,7 - diol; $\Delta^5$ - cholestene - 3β,17β - diol; $\Delta^5$-cholestene-3β,7β-diol; $\Delta^4$ - 9β - androstene - 3β,6β - diol - 17 - one; anhydrostrophantidine; ergosterol; $\Delta^5$ - pregnene - 3β,7,11α - triol-20-one; 19-nor-$\Delta^{5(10)}$-9β-pregnen-3α-ol-20-one, etc.

The process of the present invention makes possible the obtention, with good yields, of steroids having a cyclopropane ring, of great interest for their pharmaceutical uses, as for example, 5α,10α-methylene-estrane-3α,17β-diol and 16α - chloro - 5α,10α-methylene-estrane-3α,17β-diol, which exhibit anti-estrogenic, anti-gonadotrophic and anti-fibrillatory properties.

In addition, the compounds obtained by the process of the present invention are intermediate products for the production of compounds having pharmaceutical properties of importance, known to those skilled in the art. For example, 5α,10α - methylene - estrane - 3α,17β - diol, 17α - methyl - 5α,10α - methylene - estrane-3α,17β-diol and 17α - ethyl - 5α,10α - methylene - estrane - 3α,17β-diol by catalytic hydrogenation, as with platinum oxide, produce the corresponding 10α-methyl derivatives, which upon conventional oxidation at C–3, followed by conventional dehydrogenation between C–4 and C–5 produce the important corresponding $\Delta^4$-3-keto-10α-methyl derivatives, which are in part the subject of Belgian Patent No. 577,616. Likewise, a 3α-hydroxy-$\Delta^{5(10)}$-9β steroid may be initially converted according to the process of this invention to a 3α-hydroxy-5α,10α-methylene-9β steroid and upon hydrogenation of said steroid according to the second aspect of this invention, there is obtained the corresponding 3α - hydroxy - 10α - methyl - 9β - steroid, i.e. retrosteroids in which the configuration at the 9- and 10-carbon atoms is reversed from that of normal steroids. In the same manner, the obtention of 5β,6β-methylene-pregnan-3β-ol-20-one from pregnenolone by the process of the present invention, may lead to the 6(α or β)-methyl progesterone by energetic hydrogenation followed by oxidation of the hydroxyl group and conventional dehydrogenation between C–4 and C–5. The 6-methyl-progesterone has pharmaceutical properties of great importance, known to the one skilled in the art.

While the foregoing conversions have been typified by compounds wherein the 3-hydroxy group controls the orientation of the methylene group upon addition to the double bond, it is apparent that hydroxy groups in other positions may be utilized in this reaction. Thus, for example, 19 - hydroxy - $\Delta^5$ - androstene may be employed for the introduction of a 5β,6β-methylene group; and in a totally analogous manner to that described above, the 5β,6β-methylene group may then be cleaved to yield the corresponding 6β-methyl steroid. Similarly, a 11-hydroxy group may be utilized to direct the introduction of a methylene group in a 5,10-dehydro steroid, the configuration of this methylene group again being the same as that of the 11-hydroxy group. Upon utilization of the second aspect of this invention, this 5,10-methylene group (fused cyclopropane ring) may then be cleaved to yield a 10- methyl group of the same configuration as the methylene group.

The specific examples set forth hereinafter, are intended to illustrate the present invention, not to limit its scope.

PREPARATION 1

A solution of 1 g. of $\Delta^{5(10)}$-estrene-3,17-dione (U.S. Patent 2,729,654) in 50 cc. of tetrahydrofuran was added over a period of 30 minutes to a stirred suspension of 1 g. of lithium aluminum hydride and 50 cc. of anhydrous tetrahydrofuran. The mixture was heated to reflux during 2 hours, then it was cooled and treated cautiously with 50 cc. of ethyl acetate and 2 cc. of water. Solid sodium sulfate was added and the inorganic material was filtered off and washed conscientiously with hot ethyl acetate, the combined organic solutions produced by evaporation a crude material, which was purified by crystallization from acetone-hexane thus giving $\Delta^{5(10)}$-estrene-3α,17β-diol.

The known compounds specified under I were treated in the same manner to give the corresponding products listed under II:

| I | II |
|---|---|
| 17α-methyl-$\Delta^{5(10)}$-estren-17β-ol-3,6-dione. | 17α-methyl-$\Delta^{5(10)}$-estrene-3α,6α,17β-triol. |
| 17α-ethyl-$\Delta^{5(10)}$-estren-17β-ol-3,6-dione. | 17α-ethyl-$\Delta^{5(10)}$-estrene-3α,6α,17β-triol. |
| 16α-chloro-$\Delta^{5(10)}$-estrene-3,17-dione. | 16α-chloro-$\Delta^{5(10)}$-estrene-3α,17β-diol. |

PREPARATION 2

The compounds specified hereinafter under I obtained according to Bowers et al., U.S. pat. appl. Ser. No. 293,891, filed July 9, 1963, from the corresponding $\Delta^5$-19-hydroxy compounds by treatment with chromium trioxide in pyridine, were treated according to Preparation 1 to give the corresponding products listed under II:

| I | II |
|---|---|
| Acetate of $\Delta^{5(10)}$-estren-3β-ol-6,17-dione. | $\Delta^{5(10)}$-estrene-3β,6α,17β-triol. |
| 3-acetate of 17α-methyl-$\Delta^{5(10)}$-estrene-3β,17β-diol-6-one. | 17α-methyl-$\Delta^{5(10)}$-estrene-3β,6α,17β-triol. |
| Acetate of $\Delta^{5(10)}$-19-nor-22-isospirosten-3β-ol-6-one. | $\Delta^{5(10)}$-19-nor-22-isospirostene-3β,6α-diol. |
| Acetate of $\Delta^{5(10)}$-19-nor-pregnen-3β-ol-6,20-dione. | $\Delta^{5(10)}$-19-nor-pregnene-3β,6α,20β-triol. |
| Acetate of 17,20;20,21-bismethylenedioxy-$\Delta^{5(10)}$-19-nor-pregnen-3β-ol-6-one. | 17,20;20,21-bismethylenedioxy-$\Delta^{5(10)}$-19-nor-pregnene-3β,6α-diol. |

Example 1

A mixture of 4 g. of methylene iodide, 1 g. of zinc copper couple (prepared according to H. E. Simmons and R. D. Smith, J. Am. Chem. Soc. 81, 4256 (1959)) and 20 cc. of ethyl ether were boiled under reflux during 1 hour. The resulting mixture was filtered and the filtrate was added to a solution of 1 g. of $\Delta^{5(10)}$-estrene-3α,17β-diol in 20 cc. of ethyl ether. The whole was boiled under reflux during 1 hour, then 15 cc. of solvent were evaporated and the liquid residue was introduced into a sealed tube, which was maintained at 100° C. during 2 hours. The tube was cooled, the content was diluted with ether, washed successively with 10% ammonium chloride solution, a 5% sodium carbonate solution, then with water to neutral, dried over sodium sulfate and evaporated to dryness. The solid residue was chromatographed on a column of 20 g. of alumina thus giving 5α,10α-methylene-estrane-3α,17β-diol. Yield: 80%.

Example 2

A mixture of 3.6 g. of zinc copper couple, 11.5 g. of methylene iodide, 50 cc. of anhydrous ethyl ether, 0.02 g. of iodide and 5 g. of 17α-methyl-$\Delta^{5(10)}$-estrene-3α,6α-17β-triol was refluxed with stirring during 1 hour. Then 15 cc. of solvent were evaporated and the liquid residue was introduced into a sealed tube. The tube was heated to 80° C. during 6 hours. Then the contents were diluted with 100 cc. of ethyl ether, thus giving a mixture which was washed consecutively with a solution of 5% hydrochloric acid, and aqueous 5% sodium bicarbonate solution, and water to neutral, the organic layer was dried over sodium sulfate, evaporated to dryness and the resulting residue was chromatographed on alumina to give 17α - methyl - 5α,10α - methylene - estrane - 3α,6α,17β-triol. Yield: 85%.

Example 3

The procedure of Example 1 was repeated, except that instead of zinc copper couple there was used zinc-silver, which was prepared in the same manner, substituting only the copper compound by silver compound, thus being obtained the same final product.

Example 4

The process of Example 2 was repeated with the exception that zinc copper couple was substituted by chromium-copper couple which in turn was prepared in identical manner, only substituting zinc-dust by chromium dust, thus being obtained the same final compound.

Example 5

The procedure described in Example 1 was repeated except that ethyl ether was substituted by tetrahydrofuran and the reaction in a sealed tube was carried out during 3 hours at 150° C., thus being obtained the same final compound.

Example 6

5 g. of 17α-methyl-$\Delta^{5(10)}$-estrene-3α,6α,17β-triol were treated by the procedure described in Example 2, except that ethyl ether was substituted by dioxane and the reaction in the sealed tube was effected at 170° C., during 3 hours, thus being obtained 17α-methyl-5α,10α-methylene-estrane-3α,6α,17β-triol.

Example 7

A mixture of 2 g. of zinc-copper couple, 7 g. of methylene iodide, 150 cc. of the dimethyl ether of diethylene-glycol (diglyme) and 2 g. of 17α-ethyl-$\Delta^{5(10)}$-estrene-3α,6α,17β-triol was heated to 100° C., in an opened flask during 2 hours, then it was refluxed during 48 hours, cooled and washed successively with an aqueous 10% ammonium chloride solution, a 5% aqueous sodium bicarbonate solution and water to neutral. The organic solution was dried over sodium sulfate and evaporated to dryness under reduced pressure. The residue was chromatographed on alumina thus giving 17α-ethyl-5α,10α-methylene-estrane-3α,6α,17β-triol. Yield: 70%.

Example 8

The compounds listed under I were treated according to Example 1 to give the corresponding products specified under II:

| I | II |
|---|---|
| 16α-chloro-$\Delta^{5(10)}$-estrene-3α,17β-diol | 16α-chloro-5α,10α-methylene-estrane-3α,17β-diol. |
| $\Delta^{5(10)}$-estrene-3β,6α,17β-triol | 5α,10α-methylene-estrane-3β,6α,17β-triol. |
| $\Delta^{5(10)}$-19-nor-22-isospirostene-3β,6α-diol | 5α,10α-methylene-19-nor-22-isospirostane-3β,6α-diol. |
| $\Delta^{5(10)}$-19-nor-pregnene-3β,6α,20β-triol | 5α,10α-methylene-19-norpregnane-3β,6α,20β-triol. |
| 17,20;20,21-bismethylenedioxy-$\Delta^{5(10)}$-19-nor-pregnene-3β,6α-diol. | 17,20;20,21-bismethylenedioxy-5α,10α-methylene-19-nor-pregnane-3β,6α-diol. |
| Pregnenolone | 5β,6β-methylene-pregnan-3β-ol-20-one. |
| $\Delta^5$-androstene-3β,17β-diol | 5β, 6β-methylene androstan-3β,17β-diol. |
| 6β-methyl-$\Delta^4$-androstene-3β,17β-diol. | 1β,2β-methylene-6β-methylandrostane-3β,17β-diol. |
| $\Delta^5$-cholestene-3β,7α-diol | 5α,6α-methylene-cholestane-3β,7α-diol. |
| $\Delta^5$-cholestene-3β,7β-diol | 5β,6β-methylene-cholestane-3β,7β-diol. |

Example 9

Two grams of 5α,10α-methylene-9β-estrane-3α,17β-diol, 20 ml. of acetic anhydride and 20 ml. of pyridine are heated at steam-bath temperature for one hour. At the end of this time the reaction mixture is evaporated to dryness and the solid thus obtained is recrystallized from hexane to yield 3α,17β-diacetoxy-5α,10α-methylene-9β-estrane.

One gram of this material in 20 ml. of acetic acid is hydrogenated in the presence of pre-reduced platinum oxide and a pressure of 40 atmospheres. Upon the absorption of the theoretical amount of hydrogen, the reaction mixture is filtered and the filtrate is evaporated to dryness to yield 3α,17β-diacetoxy-9α,10α-androstane. This material may be hydrolyzed by refluxing it with 2 g. sodium hydroxide and 50 ml. of methanol for one hour, followed by precipitation through the addition of water and collection of the solid by filtration. There is thus obtained 9β,10α-androstane-3α,17β-diol which may be modified according to conventional routes employed for the corresponding androstanes of normal configuration.

Other steroids having a reversed configuration at positions 9 and 10, i.e. a retrosteroid, may be provided according to this procedure. Thus, for example, 19-nor-$\Delta^{5(10)}$-9β-pregnen-3α-ol-20-one may be converted to 9β,10α-pregnan-3α-ol-20-one via this process.

Likewise other compounds of the present invention having a cyclopropane group in other positions may be converted to the corresponding methyl compound according to the procedure of this example.

I claim:

1. A process which comprises treating a steroid containing a group selected from a double bond with a homoallylic hydroxyl group and a double bond with an allylic hydroxyl group with an iodo-methyl metal iodide, wherein the metal has an oxidation potential between +0.25 v. and +1.18 v. in a hydrocarbon solvent having in the molecule at least one ether function, in the absence of alkyl iodide, to give the corresponding steroid having a cyclopropane grouping in position cis with respect to the hydroxyl group.

2. The process of claim 1 wherein the metal is zinc.

3. The process of claim 1 wherein the solvent is ethyl ether.

4. The process of claim 1 wherein the solvent is tetrahydrofuran.

5. The process of claim 1 wherein the solvent is dioxane.

6. The process of claim 1 wherein the alkyl iodides are eliminated by evaporation of a fraction of the solvent.

7. The process of claim 1 wherein the starting steroid has a double bond between C–5 and C–10.

8. A process for obtaining a steroid comprising in the molecule a cyclopropane grouping with configuration cis with respect to a hydroxyl group selected from the group consisting of an allylic and a homoallylic hydroxyl group which comprises reacting the corresponding steroids containing a group selected from a double bond-allylic hydroxyl and a double bond-homoallylic hydroxyl group, with iodo methyl zinc iodide in ethyl ether, eliminating the formed alkyl iodides by evaporation of a fraction of the reaction mixture, and continuing the reaction under a pressure higher than the atmospheric pressure, at temperatures between 50° C. and 200° C. over a period of from about thirty minutes to about 48 hours.

9. The process of claim 8, wherein the starting compound is $\Delta^{5(10)}$-estrene-3β,6α,17β-triol.

10. The process of claim 8, wherein the starting compound is $\Delta^{5(10)}$-19-nor-pregnene-3β,6α,20β-triol.

11. The process of claim 8, wherein the starting compound is 17α-methyl-$\Delta^{5(10)}$-estrene-3α,6α,17β-triol.

12. The process of claim 8, wherein the starting compound is $\Delta^{5(10)}$-estrene 3α,17β-diol.

13. The process of claim 8, wherein the starting compound is pregnenolone.

14. The process of claim 8 wherein the starting compound is $\Delta^5$-androstene-3β,17β-diol.

15. The process of claim 8 wherein the starting steroid has a double bond between C–5 and C–6.

16. The process of claim 8, wherein the starting compound has a 9β configuration.

17. The process of claim 8, wherein the starting compound is $\Delta^{5(10)}$-9$\beta$-estrene having a 3$\alpha$-hydroxy group.

18. The process of claim 8, wherein the hydroxyl group is in the C–19 position.

19. The process of claim 8 including the step of hydrogenating the fused cyclopropyl steroid whereby the cyclopropyl group is converted to a methyl group having the same configuration as the cyclopropyl group.

20. The process of claim 19, wherein a 5$\alpha$,10$\alpha$-methylene steroid is converted to a 10$\alpha$-methyl steroid.

21. The process of claim 19, wherein a 5$\beta$,10$\beta$-methylene steroid is converted to a 10$\beta$-methyl steroid.

22. The process of claim 19, wherein a 5$\beta$,6$\beta$-methylene steroid is converted to a 6$\beta$-methyl steroid.

23. The process of claim 20 wherein a 5$\alpha$,10$\alpha$-methylene-9$\beta$-steroid is converted to a 10$\alpha$-methyl-9$\beta$-steroid.

References Cited
UNITED STATES PATENTS

Ginsig et al., Journal Org. Chem. (1966), pp. 1761–1764 relied on.

ELBERT L. ROBERTS, *Primary Examiner.*